Nov. 27, 1951 T. E. NELSON 2,576,721
OIL SEAL
Filed June 12, 1948
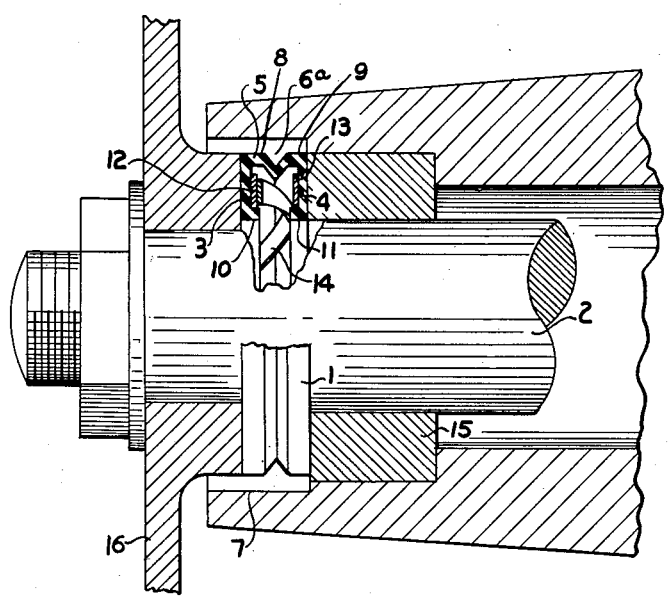
INVENTOR.
THOMAS EDWARD NELSON.
BY
ATTORNEY.

Patented Nov. 27, 1951 2,576,721

UNITED STATES PATENT OFFICE 2,576,721

OIL SEAL

Thomas Edward Nelson, Pontiac, Mich.

Application June 12, 1948, Serial No. 32,621

2 Claims. (Cl. 286—11)

This invention relates to oil seals and is an improvement of my earlier Patent No. 2,173,075, the object being to provide a new and improved sealing element for preventing seepage of oil along a shaft within a cylindrical housing and also prevents seepage radially of the housing.

These and other features and objects of the invention are hereinafter more fully described and claimed and the preferred form of the invention is shown in the accompanying drawing which is an elevation partly in section of my improved sealing element.

The sealing ring is shown at 1 on the rotatable shaft 2 and is formed with the parallel side walls 3 and 4 and a peripheral wall 5 which is out of contact with the inner periphery of the recess 7. Preferably the peripheral surface of the wall 5 of the sealing ring has a V groove 6a centrally disposed and providing two plane surfaces 8 and 9 out of contact with the inner surface of the recess 7. The side walls 3 and 4 each have an inturned edge 10 and 11 which engage the surface of the shaft.

There is also a washer 12 on the inner face of the side wall 3 engaging over the inturned edge 10 of the side wall and a washer 13 engages over the inturned edge 11 of the ring 1. Between the side walls 3 and 4 is a wave spring 14 which engages the inner surfaces of the washers 12 and 13 which may be of metal or fiber and the wave spring 14 contacts each of the washers 12 and 13 at spaced points about the surface thereof.

The ring 1 may be made of flexible or semi-flexible material to compensate for any inaccuracy in the centering of the shaft on the center line of the housing and tends to maintain the side walls 3 and 4 of the ring in parallel relation and in contact with the shaft supporting element 15 on one side thereof and the flat surface of the hub of a gear or pulley 16.

It is believed obvious from the foregoing description taken in conjunction with the drawing that my improved sealing element is comparatively simple and inexpensive in character and effectually prevents seepage of oil along the shaft or the inner surface of the housing.

Having thus briefly described my invention, its utility and mode of operation, what I claim and desire to secure by Letters Patent of the United States is:

1. An oil seal between a stationary flat surface and a rotating flat surface on a rotatable shaft, comprising an annular member formed of resilient composition material and being M-shaped in cross section, opposed inturned annular flanges projecting from the ends of the legs thereof, said annular member being positioned around said shaft between the stationary flat surface and the rotating surface so that the outer surfaces of the annular member at its opposite sides cooperatively bear against said flat surfaces, and the outer circular surfaces of said flanges cooperatively bear against said shaft, longitudinally spaced washers bearing upon the inner surfaces of said annular member, being centered by and supported over said flanges which centrally project through said washers, and a wave spring of circular form within said annular member and alternately contacting said washers at spaced points throughout their respective inner surfaces.

2. A seal for preventing seepage of oil along a shaft, a flat surface of a housing in which the shaft is positioned and a rotatable flat surface on said shaft spaced from said housing, comprising a ring of flexible material of general rectangular form in cross section, the inner peripheral wall of said ring having an annular slot providing opposed inturned longitudinally extending flanges of circular shape cooperatively engageable with said shaft, the outer peripheral wall having an annular V-shaped groove therein, said slot being of increased length inwardly of said flanges defining an annular recess of M-shape in cross section, the outer flat end walls of said ring respectively engaging the corresponding rotating and non-rotating flat surfaces, spaced washers upon the interior of said ring bearing against the inner surfaces of said flat end walls, with said flanges projecting through the openings in said washers for supporting the same, and a wave spring of circular form within said ring alternately contacting at its ends said washers throughout spaced points of their surfaces for resiliently urging said end walls against said rotating and non-rotating surfaces.

THOMAS EDWARD NELSON.

REFERENCES CITED

The following references are of record in the file of this patent:

UNITED STATES PATENTS

| Number | Name | Date |
|---|---|---|
| 1,956,366 | Vedovell | Apr. 24, 1934 |
| 2,250,348 | Beier | July 22, 1941 |
| 2,276,622 | Leake | Mar. 17, 1942 |
| 2,403,298 | Payne | July 2, 1946 |
| 2,447,663 | Payne | Aug. 24, 1948 |

FOREIGN PATENTS

| Number | Country | Date |
|---|---|---|
| 109,667 | Sweden | of 1944 |
| 564,714 | Great Britain | of 1944 |